(No Model.)
J. M. FENNERTY.
BILGE WATER INDICATOR.
No. 267,856. Patented Nov. 21, 1882.
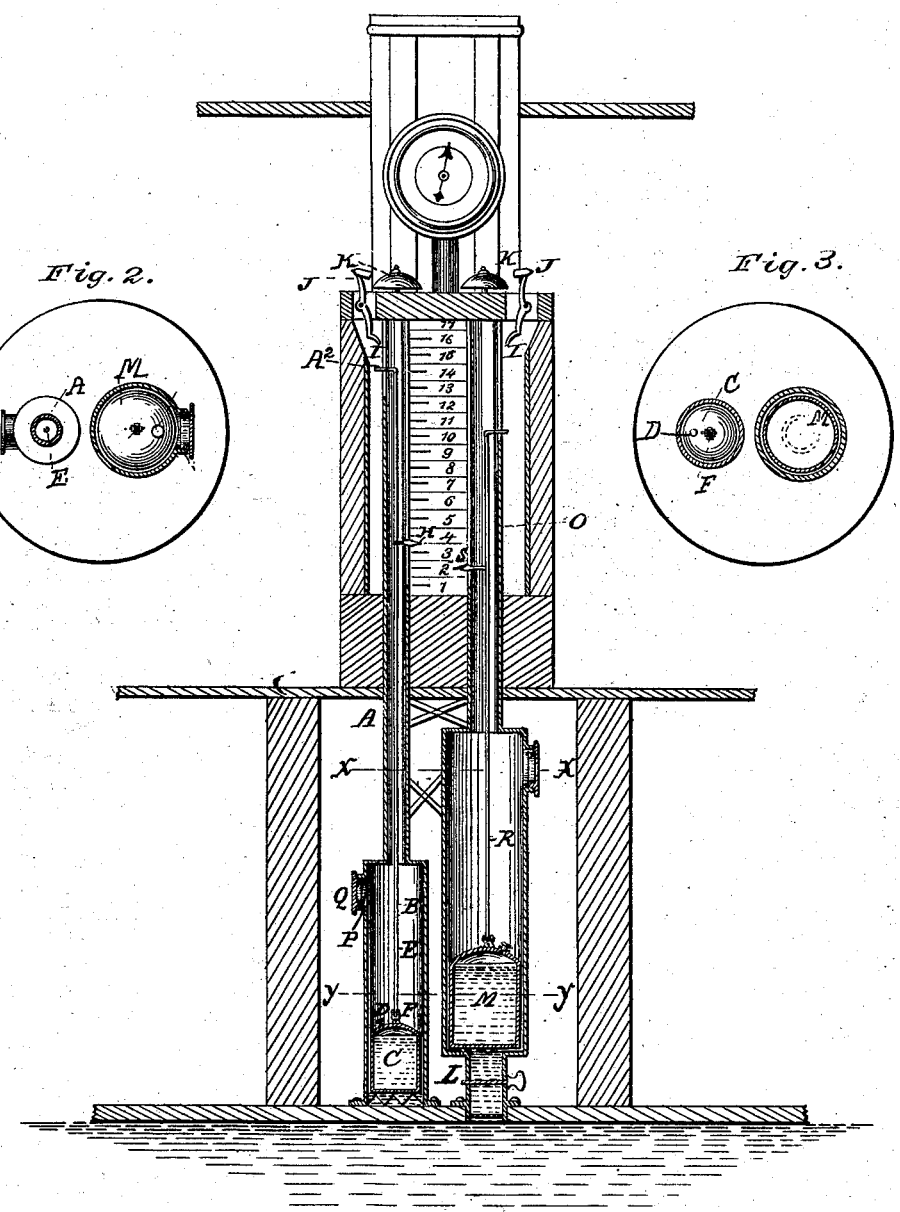
WITNESSES:
INVENTOR
John M. Fennerty
by C. A. Snow & Co.
ATTORNEYS.

UNITED STATES PATENT OFFICE.

JOHN M. FENNERTY, OF MEMPHIS, TENNESSEE.

BILGE-WATER INDICATOR.

SPECIFICATION forming part of Letters Patent No. 267,856, dated November 21, 1882.

Application filed April 22, 1882. (No model.)

*To all whom it may concern:*

Be it known that I, JOHN M. FENNERTY, of Memphis, in the county of Shelby and State of Tennessee, have invented certain new and useful Improvements in Bilge-Water Indicators and Depth-Gages for Vessels; and I do hereby declare that the following is a full, clear, and exact description of the invention, which will enable others skilled in the art to which it appertains to make and use the same, reference being had to the accompanying drawings, which form a part of this specification.

Figure 1 is a vertical sectional view. Fig. 2 is a horizontal sectional view on the line $x\ x$, and Fig. 3 is a horizontal sectional view on the line $y\ y$.

Corresponding parts in the several figures are denoted by like letters of reference.

This invention relates to bilge-water indicators and depth-gages for vessels; and it consists in certain improvements in the construction of the same, which will be hereinafter fully described, and particularly pointed out in the claim.

In the drawings hereto annexed, A represents a tube arranged vertically in the vessel to which this invention is applied, and extending from the bottom of the hold up through the engine-room and into the pilot-house, if in a steamer. In a sailing-vessel the arrangement is to be properly modified.

The lower end of the tube A is enlarged to form a chamber, B, within which a float, C, is arranged to slide vertically. In order to render this float very buoyant, I prefer to charge it with hydrogen or other gas, a screw-plug, D, being provided, through which it may be recharged when necessary. The chamber B is provided at its upper end with a hand-hole, P, having a suitable cover, Q, to enable the float to be reached and obstructions to be cleared away.

E is a rod or wire, connected to the upper end of float C by a universal joint, F, and extending upward to the upper end of tube A, which is at this point constructed of glass or with a graduated glass front to enable a hand or indicator, H, upon the rod E to be seen, which thus indicates the height of water in the hold. Rod E is also provided at its upper end with an arm, $A^2$, adapted to engage a lever, I, carrying a hammer, J, adapted to strike a bell or gong, K, and thus sound an alarm when the water has reached a certain height.

O is a vertical tube, arranged parallel to and a short distance from tube A, and extending through the bottom of the vessel, as at L. The lower end of tube O has a chamber containing a float, M, having a universally-jointed upward-projecting rod, R, provided with a hand or indicator, S, visible through a graduated glass front in the upper end of the tube, thus indicating the draft of the vessel.

Having thus described my invention, I claim and desire to secure by Letters Patent of the United States—

In a bilge-water indicator, the combination of a tube enlarged at its lower end so as to form a chamber having a hand-hole, a float moving in said chamber, an indicator-rod extending upward from said float and having at its upper end an arm, $A^2$, and an alarm-bell lever operated by said arm $A^2$, as set forth.

In testimony that I claim the foregoing as my own I have hereto affixed my signature in presence of two witnesses.

JOHN M. FENNERTY.

Witnesses:
 THOS. FLEMING,
 A. K. HANCOCK.